United States Patent [19]
Acker et al.

[11] Patent Number: 5,536,041
[45] Date of Patent: Jul. 16, 1996

[54] GAS BAG PROTECTIVE DEVICE

[75] Inventors: Dominique Acker, Alfdorf; Gunter Maier, Donzdorf-Winzingen; Thomas Herpich, Uhingen-Sparwiesen; Michael Stütz, Spraitbach, all of Germany

[73] Assignee: TRW Repa GmbH, Alfdorf, Germany

[21] Appl. No.: 456,170

[22] Filed: May 31, 1995

[30]     Foreign Application Priority Data

May 31, 1995 [DE] Germany .............................. 9408908 U

[51] Int. Cl.⁶ ................................................. B60R 21/28
[52] U.S. Cl. ........................................... 280/740; 280/742
[58] Field of Search .................................... 280/740, 732, 280/731, 736, 741, 738, 728.1

[56]               References Cited

U.S. PATENT DOCUMENTS 3,582,107  6/1971  Goetz .
4,286,954  9/1981  McArthur et al. .
4,332,398  6/1982  Smith .
5,172,933  12/1992  Strasser ................................. 280/740
5,226,670  7/1993  Wright et al. ........................ 280/738
5,308,108  5/1994  Rion ..................................... 280/740

FOREIGN PATENT DOCUMENTS 0422840  4/1991  European Pat. Off. .
2016761  10/1970  Germany .
2251493  5/1973  Germany .
9311972  6/1993  WIPO .

Primary Examiner—Paul N. Dickson
Attorney, Agent, or Firm—Tarolli, Sundheim, Covell, Tummino & Szabo

[57]                ABSTRACT

In a gas bag protective device for a vehicle occupant with an inflatable gas bag, a gas generator with a plurality of gas outlet openings and a generally tubular diffusor surrounding the gas generator and provided with a plurality of gas distribution openings are located within the gas bag. A casing is provided for accommodating the gas bag in a folded condition, the diffusor and the gas generator.

6 Claims, 5 Drawing Sheets

GAS BAG PROTECTIVE DEVICE

FIELD OF THE INVENTION

The invention relates to a gas bag protective device for a vehicle occupant, comprising an inflatable gas bag.

BACKGROUND OF THE INVENTION

Such gas bag protective devices are well known in the art. Although such known gas bag protective devices are inflated in fractions of a second the inflation time may be excessively long in certain applications, for instance for gas bags in the lateral part of the vehicle.

Accordingly one object of the present invention is to provide a gas bag protective device which is able to be inflated even more rapidly without incurring the danger of damaging the gas bag.

SUMMARY OF THE INVENTION

In accordance with the invention, a gas bag protective device for a vehicle occupant, is provided which comprises an inflatable gas bag, a gas generator with a plurality of gas outlet openings and a generally tubular diffuser surrounding the gas generator and provided with a plurality of gas distribution openings, the gas generator and diffuser being located within the gas bag. In the preferred embodiment, a casing is provided for accommodating the gas bag in a folded condition, the diffuser and the gas generator. The gas bag has an insertion opening for insertion of the diffuser and the gas generator. The insertion opening has a border clamped between the casing and the diffuser.

Owing to the provision of the diffuser it is possible to ensure a distribution, which is optimum for the respective application, of the gases emerging from the gas generator, this meaning that inflation of the gas bag is accelerated. Simultaneously the resistance to flow within the gas bag is also reduced because of a reduction in turbulence, this leading to an acceleration of the inflation operation.

In this respect it is advantageous that the gas generator is placed within the diffuser and the latter is for its part located within the gas bag, so that on the one hand a compact design of the gas bag protective device is achieved and on the other hand short flow paths for the emerging gases are provided and, accordingly, there is a speeding up of the inflation process.

The provision of a casing for the gas bag protective device, within which the unit consisting of the diffusor and the gas generator may be mounted, renders possible a compact arrangement of the gas bag, of the diffusor and of the gas generator within the housing part and thus the production of prefabricated units.

If the casing and the diffusor constitute a clamping device for clamping a section of the gas bag, simple attachment of the gas bag on the housing part will be ensured.

A particularly advantageous design is one in which the tubular diffusor possesses an essentially full-tubular central section and a pair of terminal sections axially adjoining the same on each side and at least one of the terminal sections has a part-annular cross section with an opening directed cutout which widens with increasing distance from the central section. The result of this is that the gas leaving the gas generator is directed within the diffusor into the two open terminal sections whence it may flow into the interior of the gas bag.

If at least the central section of the diffusor is provided with a plurality of gas distribution openings, which are directed toward the internal space of the gas bag, then an even more regular distribution of the gas leaving the gas generator can be ensured.

Emergence of the gas is rendered even more regular if the gas distribution openings are arranged in a plurality of axially extending rows.

According to a further embodiment, the gas outlet openings of the gas generator are directed toward a part of the central section of the diffusor, which itself does not have any gas distribution openings, so that the high pressure occurring directly at the gas outlet of the gas generator will be taken up by the wall surface of the diffusor and the danger of damage to the gas bag will be substantially reduced. Furthermore, the high temperature of the gases leaving the gas generator is able to do less damage to the wall of the diffusor than if such gases were to directly impinge on the wall of the gas bag.

BRIEF DESCRIPTION OF THE DRAWINGS

Further advantageous developments and convenient forms of the invention will be understood from the following detailed descriptive disclosure of one embodiment thereof in conjunction with the accompanying drawings.

DESCRIPTION OF A PREFERRED EMBODIMENTS

Figure 1:
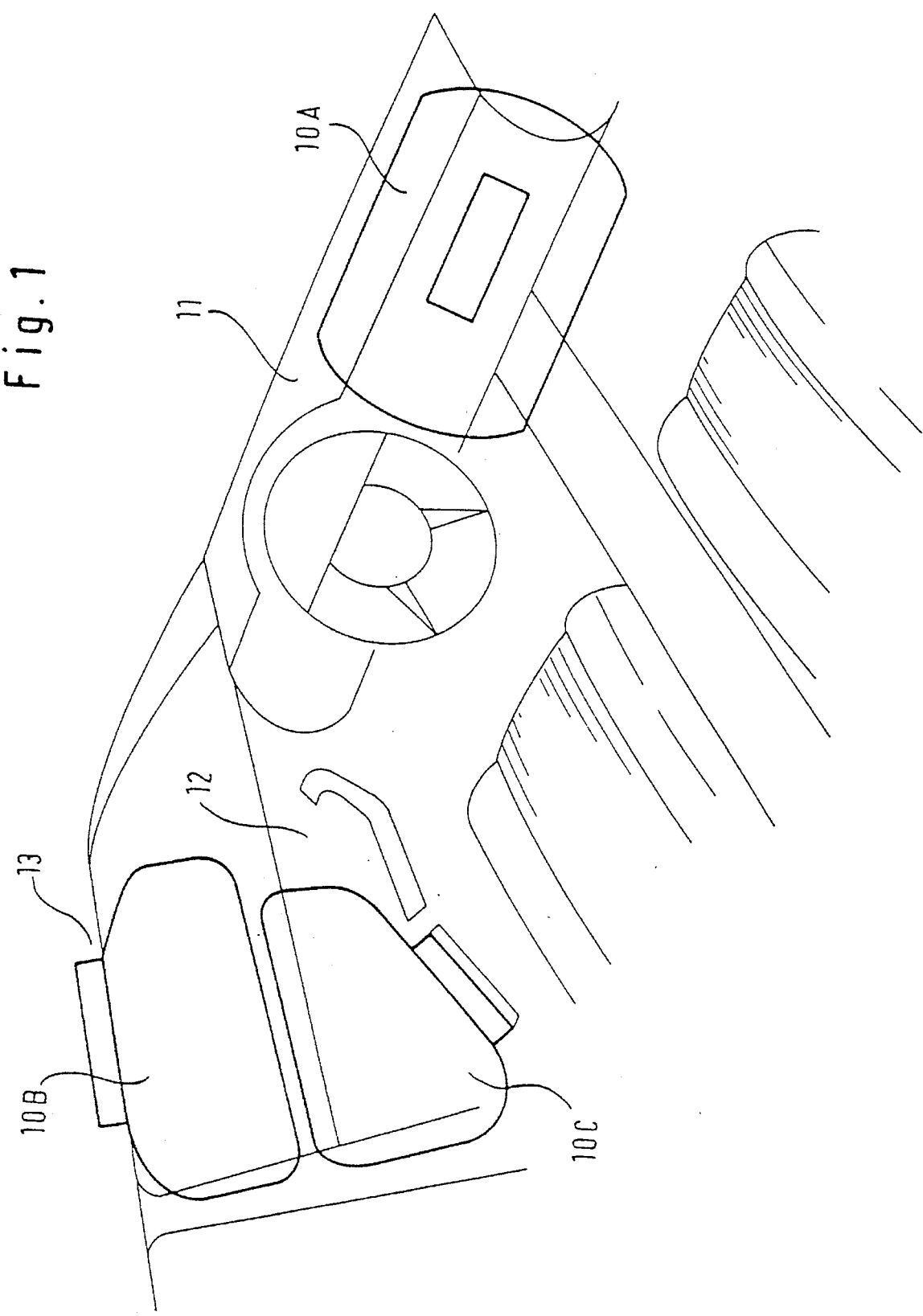
FIG. 1 is a diagrammatic sketch of several possible positions for mounting the gas bag protective device.

FIG. 1 diagrammatically shows the front part of the internal space of a vehicle with different possibilities for the arrangement of a gas bag protective device in accordance with the invention. The figure shows a first gas bag protective device 10A, which is mounted on the instrument panel 11 of the vehicle on the co-driver's side. A second gas bag protective device 10B is mounted over the door in the roof lining 13 of the vehicle and is deployed in a downward direction so that the inflated gas bag provides protection between the head of an occupant and the lateral door window. A further gas bag protective device 10C is arranged in the door lining 12 and deploys upward so that the inflated gas bag provides for protection between the side of the chest of an occupant and the door.

It is more particularly the mounting of the gas bag protective devices 10B and 10C adjacent to the door which calls for a very rapid inflation of the bag, since in a side-on crash the time between first vehicle contact, as detected by a sensor, and a deformation of the vehicle dangerous for the occupants involving contact of the occupants with the inner side of the vehicle door is extremely short. Although the lateral gas bag protective devices 10B and 10C are shown in connection with the driver's door, they may be just as well mounted on the co-driver's door or in the rear lateral part inside the vehicle.

Figure 2:
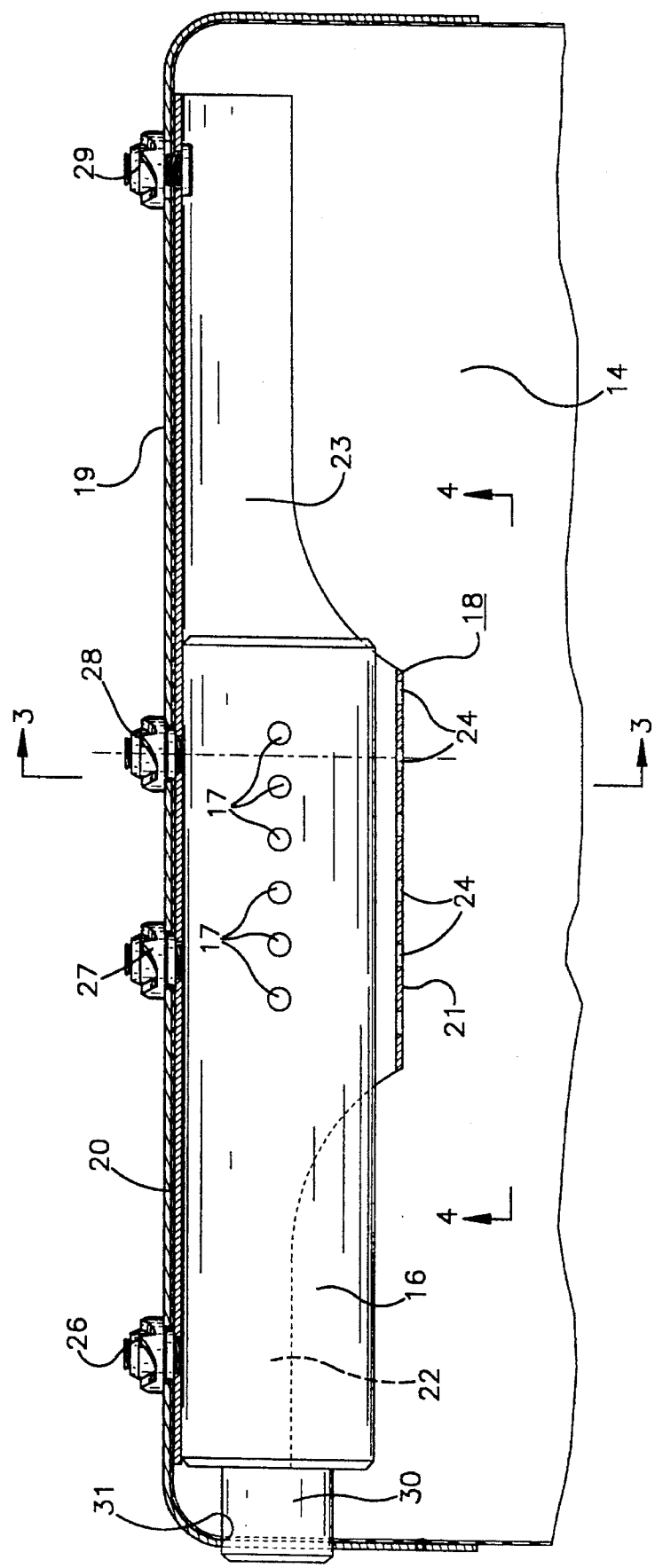
FIG. 2 is a partially sectioned lateral elevation of a gas bag protective device in accordance with the invention.

FIG. 2 shows a gas bag protective device in accordance with the invention in the mounted state. A tubular gas generator 16 is arranged within a diffusor 18, which in FIG. 2 is shown sectioned. The gas generator 16 and the diffusor 18 are firmly connected using known screw connection means 26, 27 and 28 with a casing 19 designed in the form of a half shell, there being a section 20 of a gas bag 14 clamped between the casing 19 and the diffusor 18. In this respect the diffusor 18 and the gas generator 16 are arranged inside the gas bag 14, a projecting part 30 of the gas generator extending out through an opening 31 in the gas bag 14. The gas bag 14 surrounds the projecting part 30 adjacent to opening 31 in a sealing fashion. A further screw 29 connects the diffusor 18 with the casing 19 so as to clamp the section 20 of the gas bag 14 in a zone remote from the gas generator 16.

Figure 4:
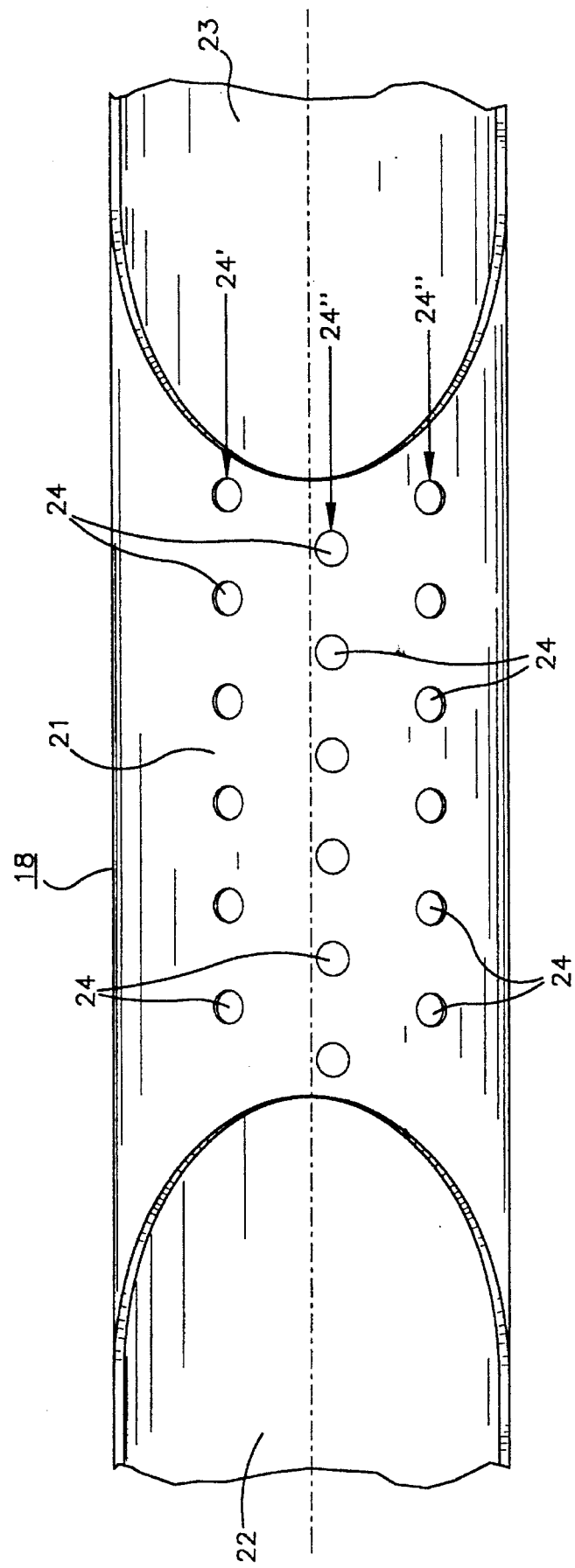
FIG. 4 is a plan view of the diffusor as seen in the direction of the arrow IV of FIG. 2.

The diffusor 18 is, like the gas generator 16, of generally tubular form. The diffusor 18 possesses a full-tubular central part 21, which is provided with a plurality of gas distribution openings 24, same pointing into the interior space of the gas bag. The terminal sections 22 and 23 adjoining the central section 21, of the diffusor 18 possess a part-annular cross section with an opening part directed toward the internal space of the gas bag 14. This opening part extends for an angle of about 180°, as shown in FIG. 4. The opening part widens circumferentially with increasing distance away from the central part 21. The respective transition between the open terminal sections 22 and 23 and the full-tubular central part 21 is essentially smooth without the formation of steps, as shown in FIGS. 2 and furthermore 4. The axial ends of the tubular diffusor 18 are open so that gas leaving the gas generator 16 may flow not only radially but furthermore axially from the diffusor.

Figure 3:
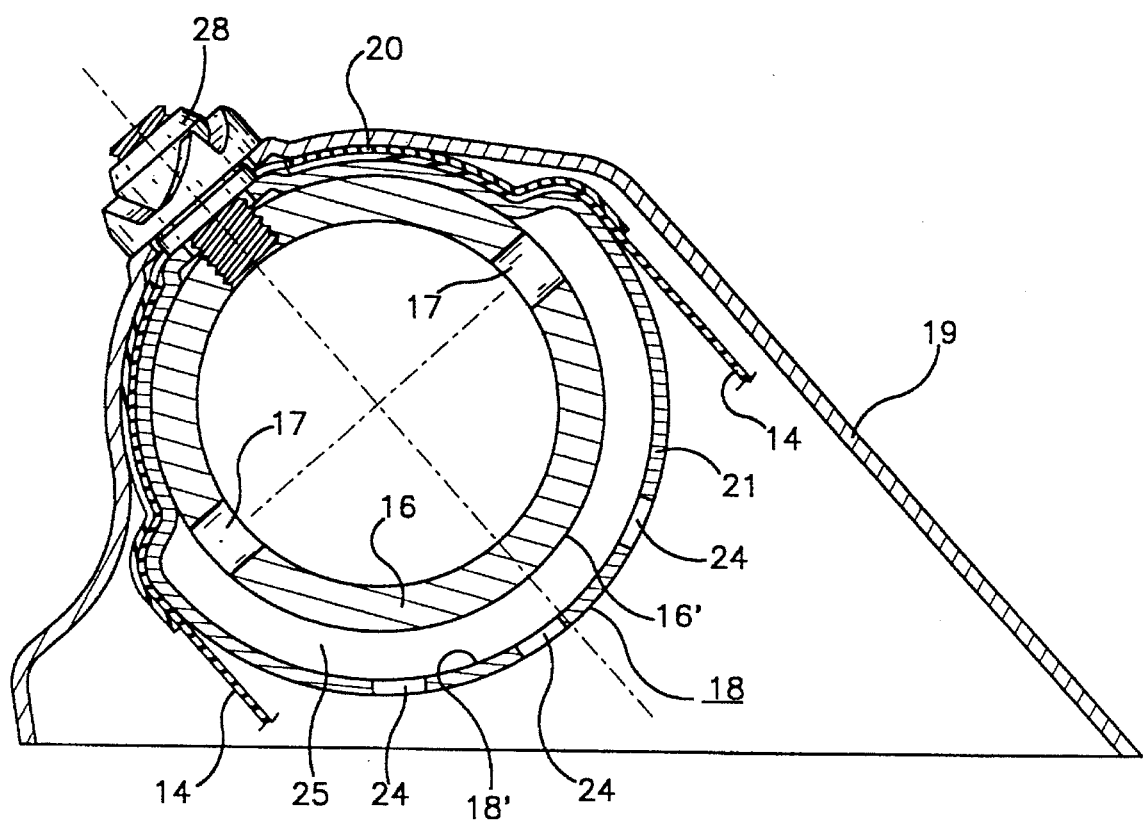
FIG. 3 is a sectioned transverse view of a gas bag protective device looking in the direction of the arrow III—III in FIG. 2.

As shown in FIG. 2 and more particularly FIG. 3, the gas generator 16 is provided with gas outlet openings 17, which are arranged on two oppositely placed sides in a respectively axis-parallel row.

The rows of gas outlet openings 17 are each arranged at an angle of approximately 90° to the center axis of the screw connections 26, 27, 28 and 29 taking up the tensile strain during inflation of the gas bag. The gas outlet openings 17 open into circumferentially spaced end sections of a part-annular cavity 25, which is formed between the external peripheral surface 16' of the gas generator 16 and the internal peripheral surface 18' of the diffusor 18. The part-annular cavity 25 extends along somewhat more than half the periphery of the gas generator and is constituted by a partial increase in diameter of the diffuser 18 in the central section 21, as is to be seen in FIG. 3. The part-annular cavity 25 is in this respect placed on the side, remote from the screw connections 27 and 28, of the gas generator 16 and so constitutes a fluid connection between the gas outlet openings 17 of the gas generator and the gas distribution openings 24 of the central section 21 and furthermore the terminal sections 22 and 23 of the diffusor 18.

On the side remote from the screw connections 27 and 28, of the central section 21 gas distribution openings 24 are provided in the central section 21, and they are directed toward the internal space of the gas bag 14. The gas distribution openings 24 are arranged in several rows 24', 24" and 24''', the inflation outlet openings in each row being arranged with a spacing in the axial direction. The rows 24', 24" and 24''' are respectively arranged in one axial plane, the axial planes being spaced apart in the peripheral direction. A preferred distance between the rows in the peripheral direction is between 25° and 35° and more especially 30°. The axial planes of the rows of gas distribution openings 24 are circumferentially spaced from the axial planes extending through the gas outlet openings 17 of the gas generator 16 so that gas leaving the openings 17 is not able to directly leave through the gas distribution openings 24 and is firstly directed toward the wall surface of the central part 21 and is hence guided through the part-annular cavity 25 to the openings 24 and the terminal sections 22 and 23. This effectively ensures that no hot gas under a high pressure will impinge directly on and damage the gas bag 14.

For the optimum distribution of the gases leaving the openings 24 FIG. 4 shows an arrangement in which the openings 24 of two rows 24' and 24" adjacent to each other in the peripheral direction are spaced from each other in relation to each other axially. Thus a radially and axially offset arrangement of the openings 24 and accordingly a more regular outflow characteristic is achieved.

Figure 5:
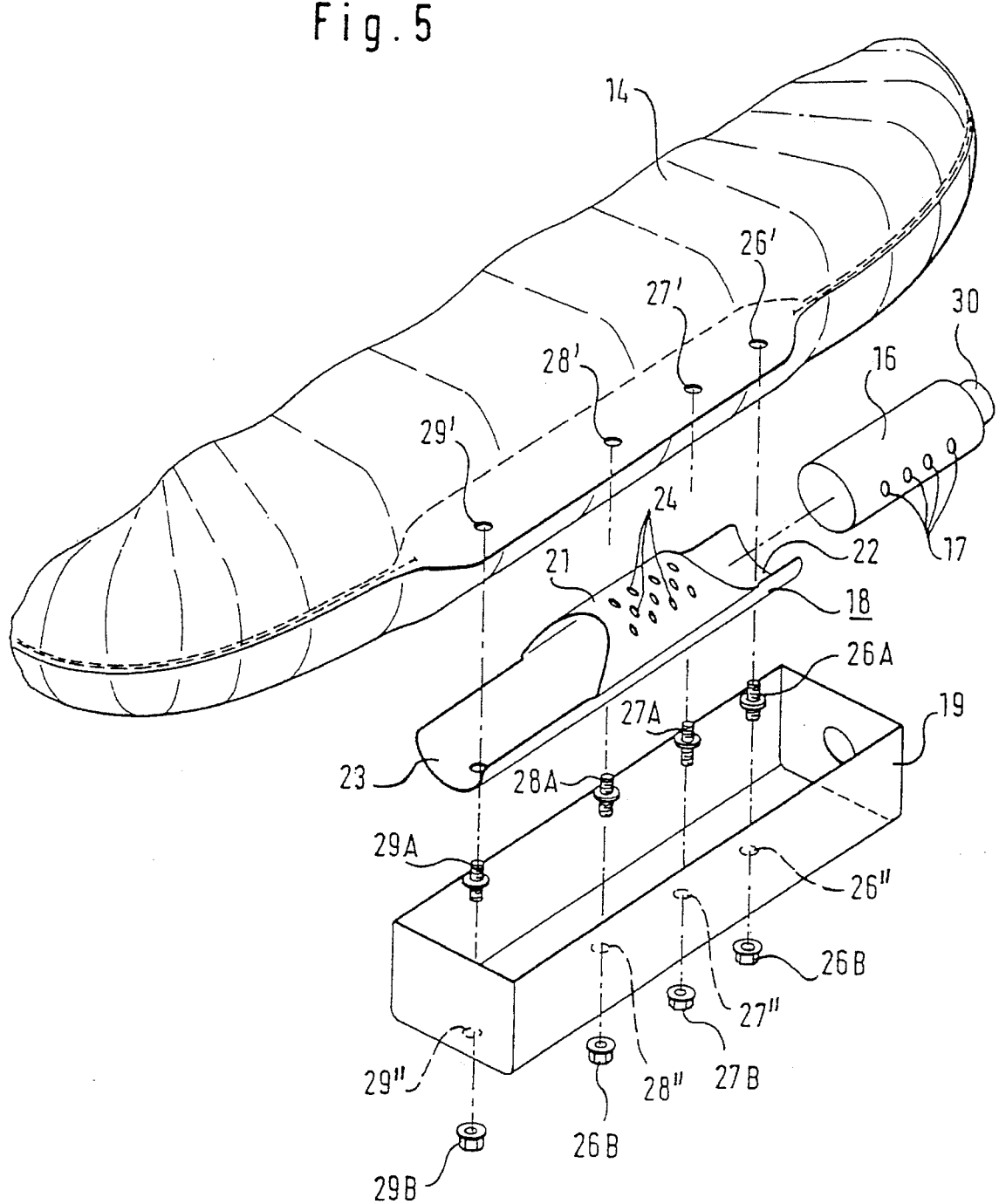
FIG. 5 is an exploded view of the gas bag protective device in accordance with the invention.

FIG. 5 shows the entire protective gas bag device in an exploded view and on the basis of this exploded view the assembly of the apparatus will be described. First the tubular gas generator 16 is introduced into the diffusor 18 so far that the gas outlet openings 17 of the gas generator 16 are directed toward the wall of the diffusor 18 in the central part 21 thereof. Then attachment screws 26A, 27A, 28A and 29A are secured in the arrangement consisting of the diffusor 18 and the gas generator 16. This arrangement is then introduced into the gas bag 14 through an insertion opening thereof and is so placed that the attachment screws 26A, 27A, 28A and 29A is extended through the corresponding holes 26', 27', 28' and 29' in a reinforced clamping border 20 of the gas bag 14 surrounding its insertion opening. Then this arrangement together with the gas bag 14 is introduced into the half-shell casing 19, the attachment screws 26A, 27A, 28A and 29A fitting through corresponding holes 26", 27", 28" and 29" in the casing 19, following which a respective nut 26B, 27B, 28B and 29B is screwed onto the associated attachment screw and is screwed tight with the result that the reinforced part 20 of the gas bag 14 is clamped between the diffusor 18 and the casing 19.

Firing of the gas generator 16 will cause gas to flow out from the gas outlet openings 17 of the gas generator into the part-annular cavity 25 where it is directed to the terminal sections 22 and 23 of the diffusor. The gas then flows along practically the entire axial length of the diffusor 18 through the openings 24 and into the gas bag 14 in a uniform manner so that the gas bag is evenly and rapidly inflated along its entire length. Local flow peaks or concentrations are prevented so that the occurrence of turbulence is substantially reduced, something which contributes to a rapid and regular inflation of the gas bag as well. It is in this manner that it is possible to inflate gas bags with a substantial longitudinal extent, as are required for instance on the side of the vehicle, quickly.

Furthermore owing to the systematic arrangement of the inflation gas outlet and distribution openings the gas current may be directed in a predetermined manner so that the deployment of the gas bag may be controlled.

What is claimed is:

1. A gas bag protective device for a vehicle occupant comprising:

an inflatable gas bag;

a gas generator with a plurality of gas outlet openings; and a generally tubular diffuser surrounding said gas generator and having a tubular center section and two opposed open end sections;

said tubular center section having a wall portion facing the interior of said gas bag and provided with a plurality of gas distribution openings;

said open end sections each having an opening which widens circumferentially with increasing distance away from said center section, forming a gas distribution window facing the interior of said gas bag; and said gas generator and diffusor being located within said gas bag.

2. The device of claim 1 wherein a casing is provided for accommodating said diffusor, said gas generator, and said gas bag in a folded condition, said gas bag having an insertion opening for insertion of said diffusor and said gas generator, said insertion opening having a border which is clamped between said casing and said diffusor.

3. The device of claim 1 wherein said gas distribution openings are provided in a plurality of rows extending in an axial direction of said diffusor.

4. A gas bag protective device for a vehicle occupant comprising:

an inflatable gas bag;

a gas generator with a plurality of gas outlet openings; and a generally tubular diffusor surrounding said gas generator and provided with a plurality of gas distribution openings;

said gas generator having a cylindrical outer wall radially spaced from said tubular diffusor on its side facing the interior of said gas bag; and a gas distribution space being defined between said outer wall of the gas generator and said tubular diffusor;

said gas distribution space having circumferentially spaced end sections and an intermediate section in-between said end sections, said gas distribution openings being located in said intermediate section;

said gas generator having gas outlet openings in said end sections of said gas distribution space; and said gas generator and diffusor being located within said gas bag.

5. The device of claim 4 wherein a casing is provided for accommodating said diffusor, said gas generator, and said gas bag in a folded condition, said gas bag having an insertion opening for insertion of said diffusor and said gas generator, said insertion opening having a border which is clamped between said casing and said diffusor.

6. The device of claim 4 wherein said gas distribution openings are provided in a plurality of rows extending in an axial direction of said diffusor.

* * * * *